United States Patent [19]

Herfeld

[11] 4,325,515

[45] Apr. 20, 1982

[54] MIXING APPARATUS AND METHOD FOR CONDENSING, MIXING AND GRANULATING THERMOPLASTIC MATERIALS

[76] Inventor: Friedrich W. Herfeld, Wall 1, 5982 Neuenrade, Fed. Rep. of Germany

[21] Appl. No.: 29,304

[22] Filed: Apr. 12, 1979

[30] Foreign Application Priority Data

Apr. 13, 1978 [DE] Fed. Rep. of Germany ....... 2815935

[51] Int. Cl.³ .................... B02C 18/12; B02C 18/22; B02C 21/00
[52] U.S. Cl. ........................ 241/57; 241/58; 241/60; 241/65
[58] Field of Search ............ 241/65, 47, 57, 58, 241/60, 62

[56] References Cited

U.S. PATENT DOCUMENTS

| | | | |
|---|---|---|---|
| 2,957,633 | 10/1960 | Andreas | 241/57 |
| 3,510,067 | 5/1970 | Beck et al. | 241/65 |
| 3,877,649 | 4/1975 | Herfeld | 241/65 X |
| 4,183,471 | 1/1980 | Pfister | 241/57 |

*Primary Examiner*—Richard B. Lazarus
*Attorney, Agent, or Firm*—Bacon & Thomas

[57] ABSTRACT

The mixing apparatus has a crushing chamber which can be continuously charged with material and a circulating chamber being in communication with the crushing chamber by way of a port. The port can be shut. The continuously charged material can be pre-condensed in the crushing chamber and be condensed and cooled in the circulating chamber. In this case the port is shut during the cooling process. Also, complete condensation can take place in the crushing chamber with the port being shut. In that case, the material is fed batch-wise into the circulating chamber for cooling.

7 Claims, 7 Drawing Figures

MIXING APPARATUS AND METHOD FOR CONDENSING, MIXING AND GRANULATING THERMOPLASTIC MATERIALS

The invention relates to a mixing apparatus for condensing, mixing and granulating thermoplastic materials, especially scrap of foils, fibres, ribbons and hollow pieces, comprising a feed hopper mounted on the cover of a mixing container, a discharge slide valve, a vertical agitator shaft which near the bottom carries stirring wings reaching close to the container wall and at its upper end carries crushing knives, and comprising a head-end crushing chamber wherein fixed counter-knives are arranged.

A mixing apparatus of the above kind is known from applicant's German patent application No. 2,258,197, where crushing, heating, granulating and cooling takes place in one single mixing container. In such a mixing apparatus the operational process is rendered difficult in that granulating and cooling cannot be performed continuously. It is desirable, however, that the material be fed continuously through the feed hopper.

There are other mixing apparatus known already which comprise two or more separate mixing containers. Such installations are of an accordingly large size.

It is the object of the present invention to develop a mixing apparatus of said kind in such a way that continuous feed of the material is possible and that, nevertheless, the material can be condensed completely and satisfactorily.

According to the invention this object is achieved in that the agitator shaft extends through an end plate of the crushing chamber and that in the ring wall is provided at least one port leading to the circulating chamber of the mixing container.

This embodiment of a mixing apparatus does not obviously follow from the prior art, because the port allows the continuous material feed to be shut off during the final condensing and/or cooling phase.

In detail, the mixing apparatus can operate in such a way that normally the crushing chamber is open towards the circulating chamber of the mixing container so that the material continuously fed into the feed hopper continuously enters, after crushing, the circulating chamber of the mixing container where it is circulated and heated under the action of the stirring wings. As soon as the temperature inside the circulating chamber of the mixing container has reached the condensing range, the port from the crushing chamber is shut so that the material in the circulating chamber of the mixing container can be completely condensed and then granulated and cooled. After cooling, the granulated material is discharged. During this phase of operation the crushing chamber serves for buffering the material continuously fed in via the feed hopper. When the circulating chamber has been emptied, the port is opened again so that the buffered material can enter the circulating chamber.

According to another embodiment the material is also condensed inside the crushing chamber, with the port being shut. After opening of the port the material is then discharged into the circulating chamber of the mixing container. During the cooling phase the port is shut again so that during the cooling process no material can flow over into the circulating chamber. In this case, the crushing chamber receives the material for crushing and condensing or pre-condensing.

As a further development it is proposed by the invention that the end plate is rigidly secured to the agitator shaft and that the edge of the end plate is disposed opposite the ring wall. This results in a particularly simple construction of the mixing apparatus. The material buffered in the crushing chamber after closing the port is discharged very rapidly after opening of the port under the action of the centrifugal force, because the end plate acts like a centrifugal disk.

As a further embodiment it is proposed by the invention that the end plate is located at a ring wall of the crushing chamber, that the agitator shaft extends through an opening of the end plate or is carried in bearing means, and that inside the crushing chamber discharging wings may be provided. This embodiment results in a very compact construction of the crushing chamber, which lends itself especially to pre-condensing or condensing the material in the crushing chamber.

To ensure a high cooling effect it is also proposed by the invention that in the shell of the mixing apparatus above the bottom a shuttable cooling-air injection opening is provided, that the suction end of a blower for cooling-air injection is in connection with the spout of the feed hopper, and that water injection means may be disposed within the cooling-air injection opening.

Particularly efficient injection of cooling air is attained in that inside the circulating chamber on a rotor disk having a diameter smaller than the stirring wings of the agitator shaft cutting blades are disposed, and that these cutting blades are opposed by a stator ring secured to the end plate and having counter-cutting blades and a circumferential screen plate. This embodiment of the invention is of particular advantage when inside the circulating chamber cooling takes place only, as the circumferential screen plate then ensures a uniform particle size of the material: for during material circulation the material must always pass through the circumferential screen plate, and so only sufficiently small-cut particles can enter the the complete circulation system.

In order that complete condensation within the crushing chamber is rendered possible, it is proposed by the invention that in the crushing chamber mixing wings are disposed on the agitator shaft, that to the filler socket is attached a ring piece placed concentrically to the agitator shaft and having counter-knives, and that a disk-shaped end piece of the agitator shaft leaves a narrow gap to a ring wall and carries crushing knives.

The invention also provides for an improved process for condensing, mixing and granulating thermoplastic materials along with material to be treated again, whereby the feed hopper is charged continuously with material to be processed, whereby this material is subjected to a size reduction in the crushing chamber and passes through a port into the circulating chamber of a mixing container, and whereby the port is shut temporarily during the process when the material is cooled in the crushing chamber of the mixing container, the material charged being buffered in the crushing chamber. This process allows the material to be charged continuously, which should be given preference on grounds of process technology.

As a further development of this process it is proposed by the invention that final condensation be performed in the crushing chamber, and that in the circulating chamber solely cooling and, if required, additional crushing to a uniform particle size of the mixture be effected. This embodiment of the invention does not only permit a continuous feed of the material, but also a continuous discharge of the cooled material.

Embodiments of the invention will now be described with reference to the accompanying drawings, wherein.

Figure 1:
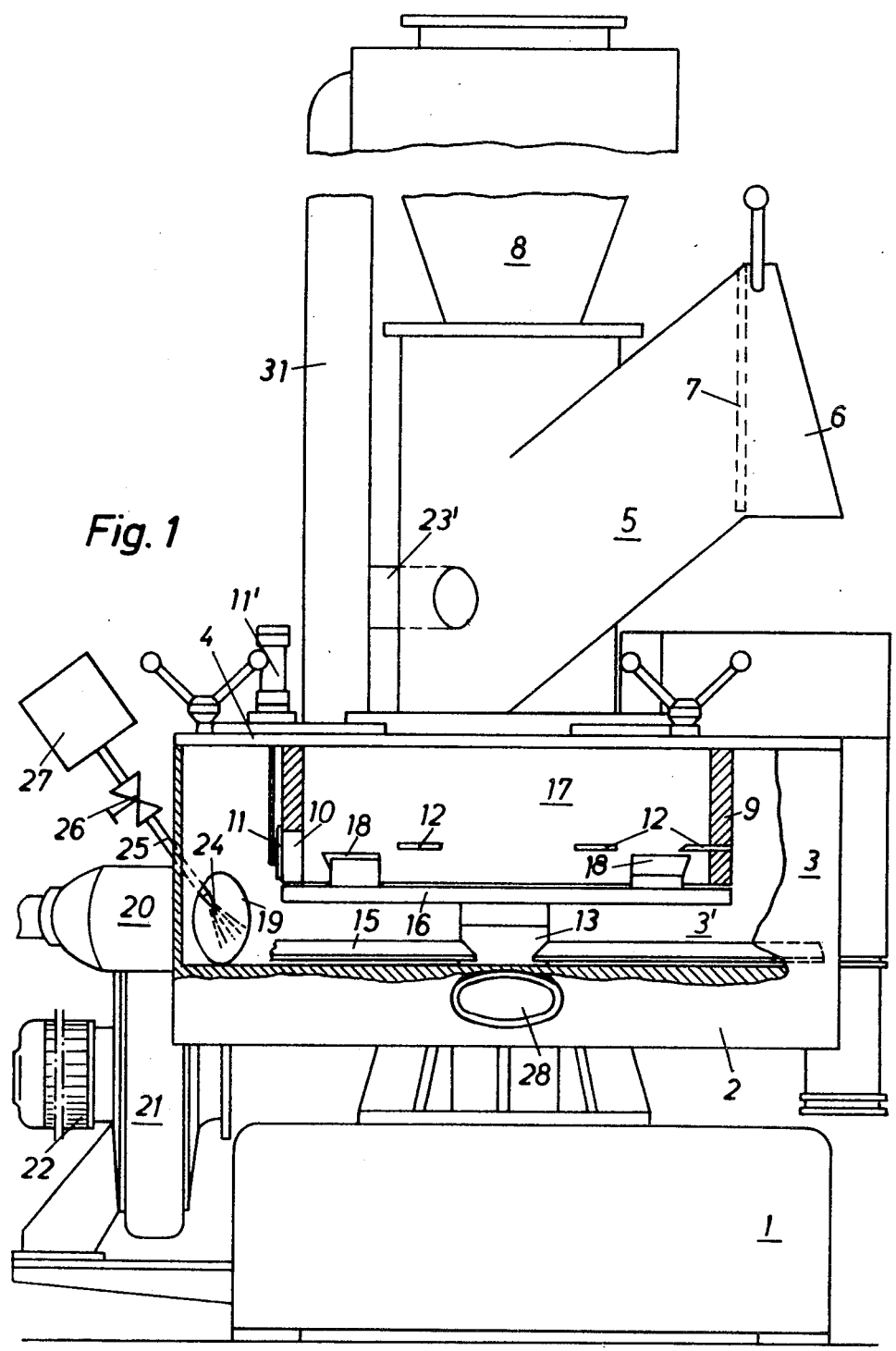
FIG. 1 is a view of a mixing apparatus according to the invention.
Figure 2:
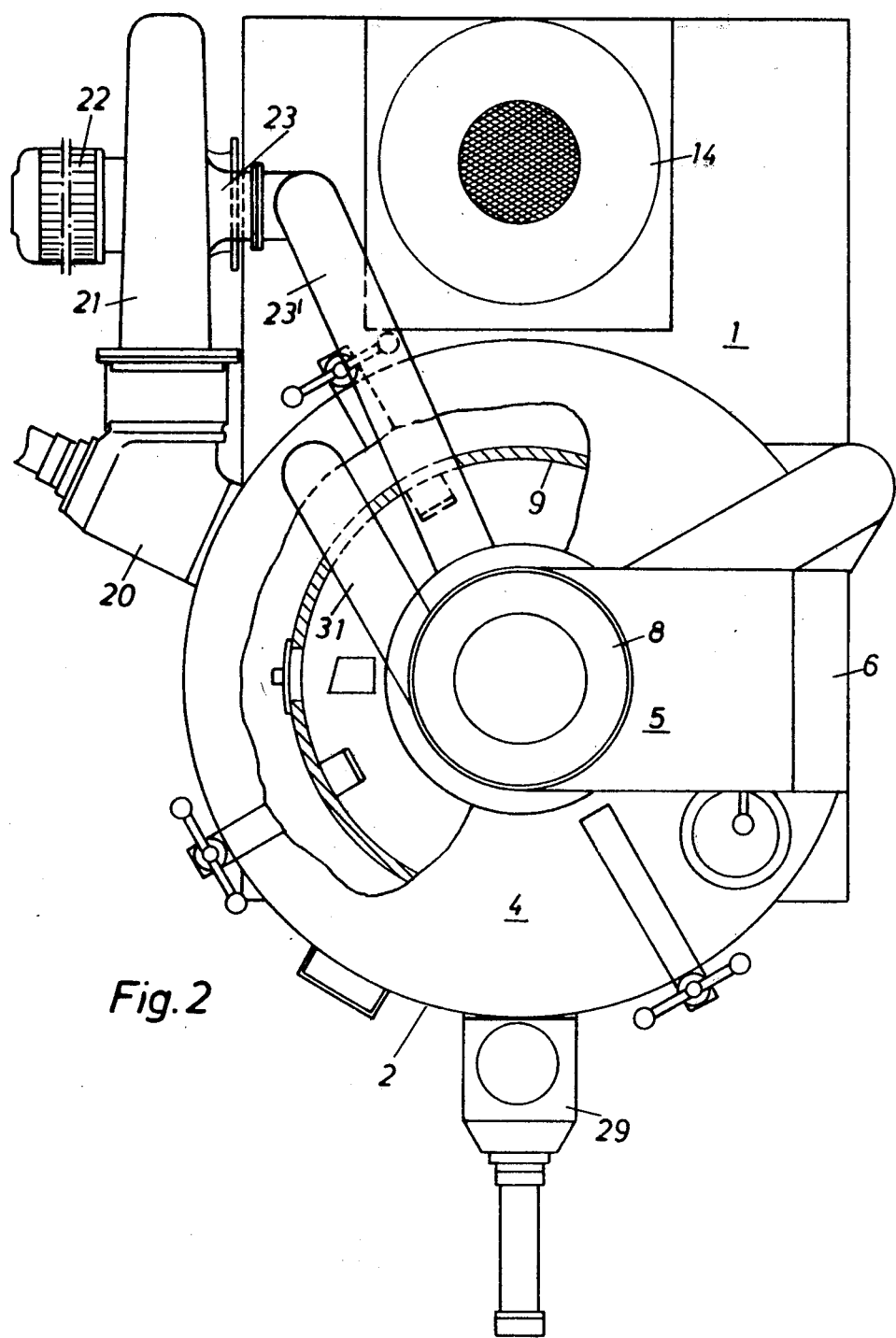
FIG. 2 is a plan view relating to FIG. 1.

The mixing apparatus shown in FIGS. 1 and 2 is mounted on a support 1. A mixing container 2 having a vertical axis and a cylindrical shell 3 is sealed by a cover 4. The cover supports a feed hopper 5 whose filler socket 6 can be shut by a flap 7. The filler socket 6 carries a cleaning attachment 8 which allows of air cleaning, e.g. a cyclone.

To the cover 4 is secured, at a location concentrically arranged to the axis of the mixing container 2, a ring wall 9 having at least one port 10 which can be shut by a slide valve 11 being adjustable by an adjusting device 11'. These can be individual separate ports 10; the port may also be designed as a circumferential annular gap. A plurality of counter-knives 12 is disposed on the circumference of the ring wall 9.

Through the bottom of the mixing container 2 extends an agitator shaft 13 being in driving connection with a motor 14. The driving elements used are V-belts, chains, sprockets and the like, which are not shown in detail. The agitator shaft 13 supports stirring wings 15 which near the bottom reach close to the container wall. The agitator shaft carries an end plate 16 whose edge is located directly opposite the front edge of the ring wall 9 and thus seals the crushing chamber 17 limited by the ring wall 9. The end plate 16 supports crushing knives 18 interacting with counter-knives 12.

In the lower area of the shell 3 is arranged a cooling-air injection opening 19 which is connected via a pipe 20 with a blower 21. The blower 21 is driven by a motor 22. The suction stub 23 of the blower 21 is connected via a pipe 23' with the feed hopper 5 so that the blower 21 can draw in the cooling air from the feed hopper 5. In the area of the cooling-air injection opening 19 is disposed a water injection device 24 which is connected via a pipe 25 and a valve 26 with a water tank 27. A pipe 31 connects the cover 4 of the mixing container with the cleaning attachment 8 so that the cooling air, having passed through the material, can leave through the cyclone inside the cleaning attachment 8.

At the bottom of the mixing tank 2 is provided a discharge opening 28, to which is connected a socket of a discharge slide valve 29.

The mixing apparatus described operates in such a way that the material to be processed, e.g. scrap of foils, fibres, ribbons or hollow pieces, is continuously charged into the filler socket 6 and fed via the feed hopper 5 into the crushing chamber 17. There the material is cut or crushed by the crushing knives 18 rotating with the agitator shaft 13 by interaction with the counter-knives 12. Normally the port 10 is open so that the cut or crushed material can continuously enter the circulating chamber 3' of the mixing container 2. The stirring wings 15 grip the material, circulate it, and by way of friction introduce heat into the material so that it is heated to the gelatinizing temperature in order that it can be condensed. This heating proceeds along with a continuous feed of the material in a continuous manner, as well. As soon as the condensing temperature has been reached, the slide valve 11 is closed so that no more material can get from the crushing chamber 17 into the circulating chamber 3' of the mixing container. In the crushing chamber 17 the still continuously fed and crushed material is buffered. The condensing process can be finished inside the mixing container 2. Following the condensation, cooling air is blown in through the cooling-air injection opening. If necessary, the cooling air can be mixed with water by means of the water injection device 24 to speed up the cooling process. The injected water is evaporated within the material mixture. The cooling air is drawn in from the feed hopper 5 in order to exhaust the dust developing during crushing and to assist the material feed by suction. When the cooling phase is over, the granulated material is discharged through the discharge slide valve 29. The slide valve 11 is opened again so that the material buffered in the crushing chamber 17 is transferred into the circulating chamber 3' of the mixing container 2. The rotating end plate 16 assists and promotes this discharge work.

In a varied process, the port 10 may be kept shut even during material feeding and crushing in order to condense it in the crushing chamber, as well. For final treatment the port is opened again so that the material is transferred into the circulating chamber of the mixing container, where it is condensed finally and cooled. During the cooling phase the port remains shut at any rate.

Figure 3:
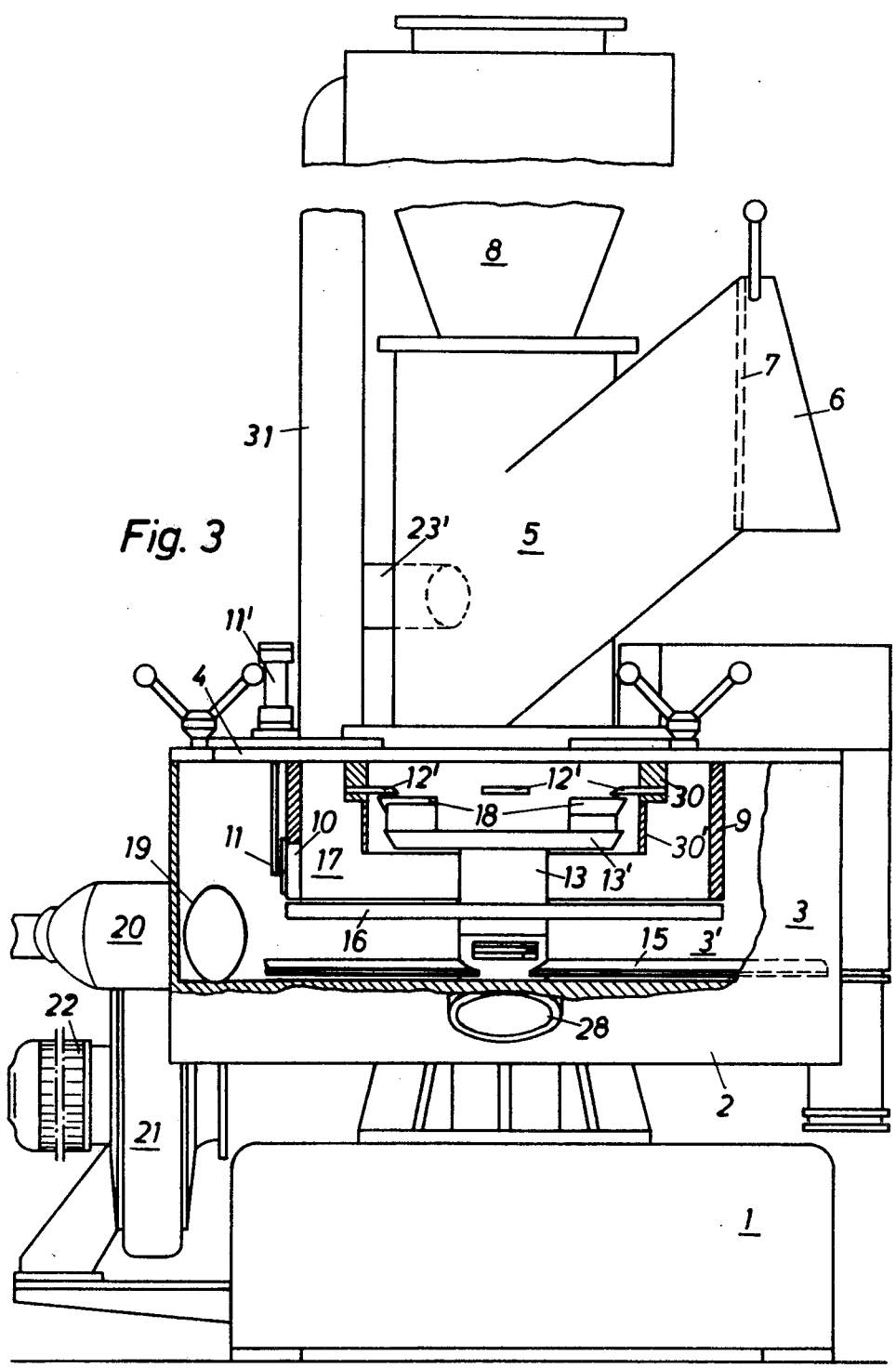
FIG. 3 is a view of a varied embodiment of a mixing apparatus.

FIG. 3 shows a varied embodiment of the invention, where an end plate 16 also seals the crushing chamber 17. But there the counter-knives 12' are not mounted on the ring wall 9, but on the ring piece 30 of the feed hopper. Again, the counter-knives 12' interact with crushing knives 18 which are secured to a disk-shaped end piece 13' of the agitator shaft 13. The disk-shaped end piece 13' leaves a narrow gap to a ring wall 30' of the ring piece 30. In this case cutting is on a line having a comparatively small radius. In some cases this is an important matter with regard to attuning the cutting torque of the crushing knives 18 to the driving torque of the stirring wings 15. The cut material drops through the narrow gap down on the end plate 16 and is discharged through the port 10 which can be shut by the slide valve 11. The operation of this mixing apparatus coincides with that of the mixing apparatus according to FIGS. 1 and 2.

Figure 4:
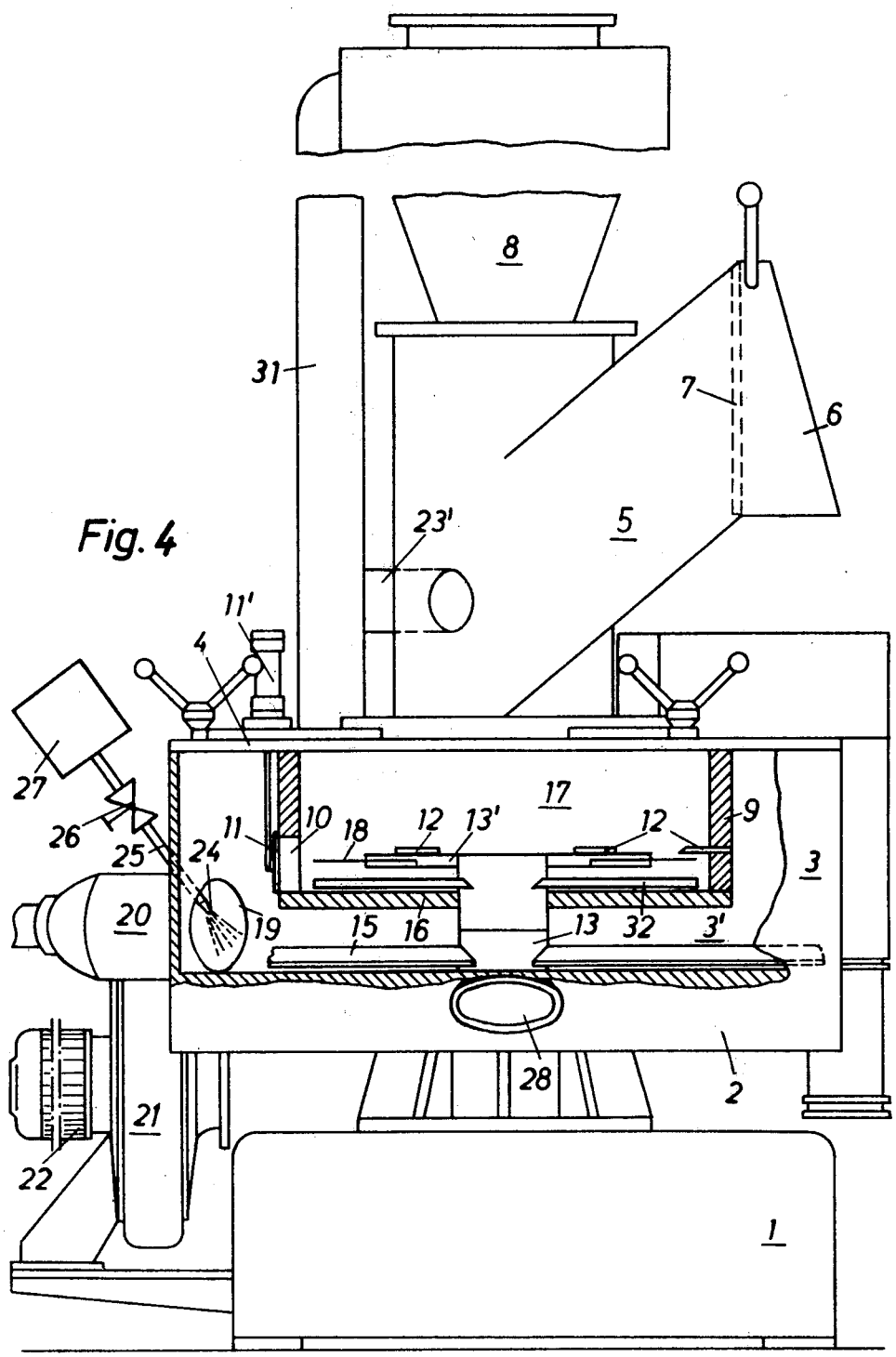
FIG. 4 is a variant of the mixing apparatus shown in FIG. 1.

FIG. 4 shows a variant of the embodiment according to FIG. 1. The end plate 16' is rigidly secured to the ring wall 9 and thus seals the crushing chamber 17. The agitator shaft 13, whose end piece 13' carries crushing knives 18, extends through a central opening in the end plate 16'. Inside the crushing chamber 17 the agitator shaft also carries discharging wings 32 which serve for circulating the material in the crushing chamber 17, possibly even for condensing or pre-condensing the material, and in any way provide for discharging the material through the port 10 when same is open.

The operation of this mixing apparatus coincides with the above description.

Figure 5:
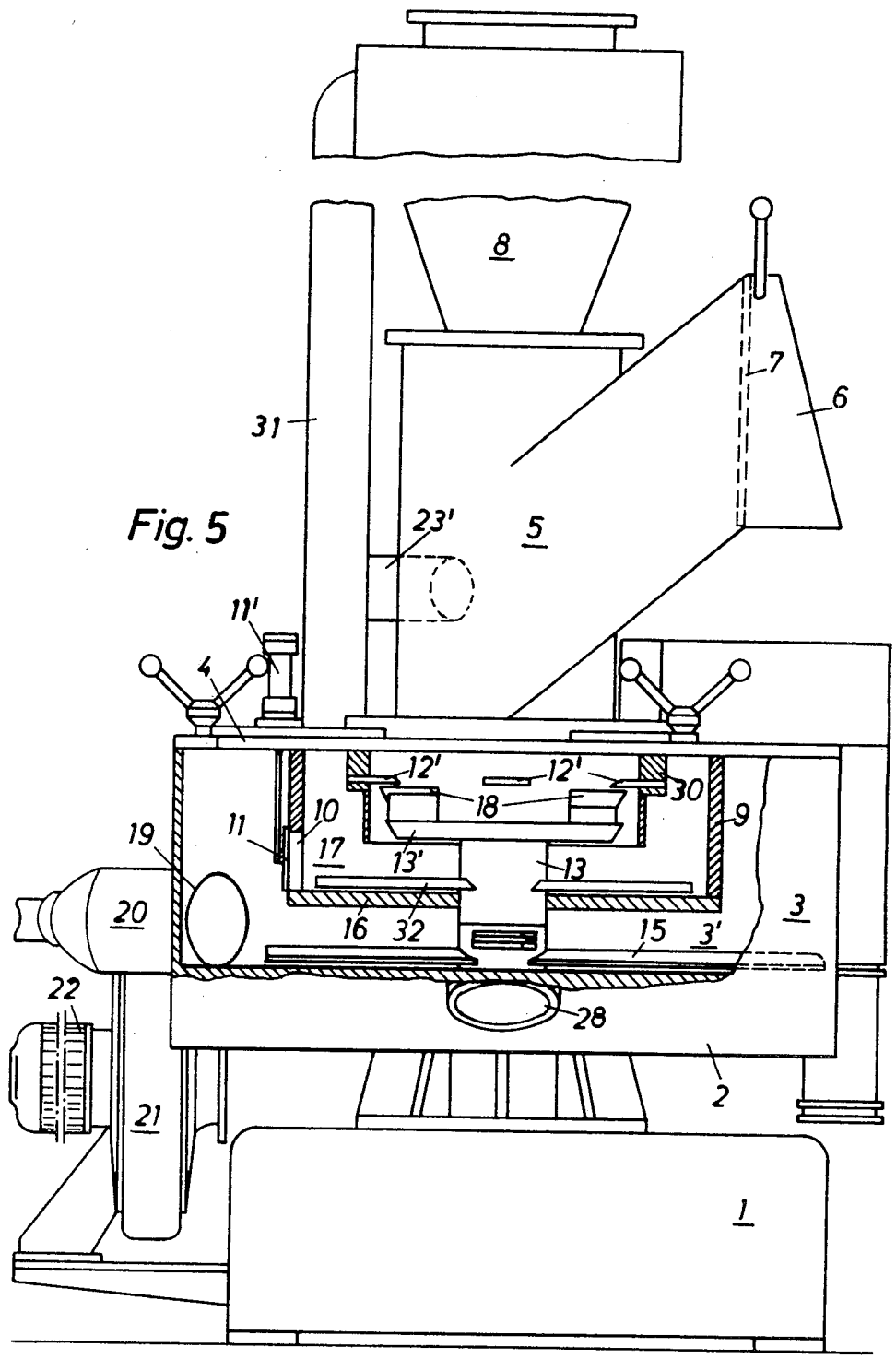
FIG. 5 is a variant of the mixing apparatus shown in FIG. 3.

FIG. 5 shows a variant of the mixing apparatus according to FIG. 3. Again, the end plate 16' is rigidly secured to the ring wall 9. Inside the crushing chamber 17, the agitator shaft 13 extending through a central opening of the end plate 16' supports discharging wings 32. The operation of this apparatus coincides with the above description.

Figure 6:
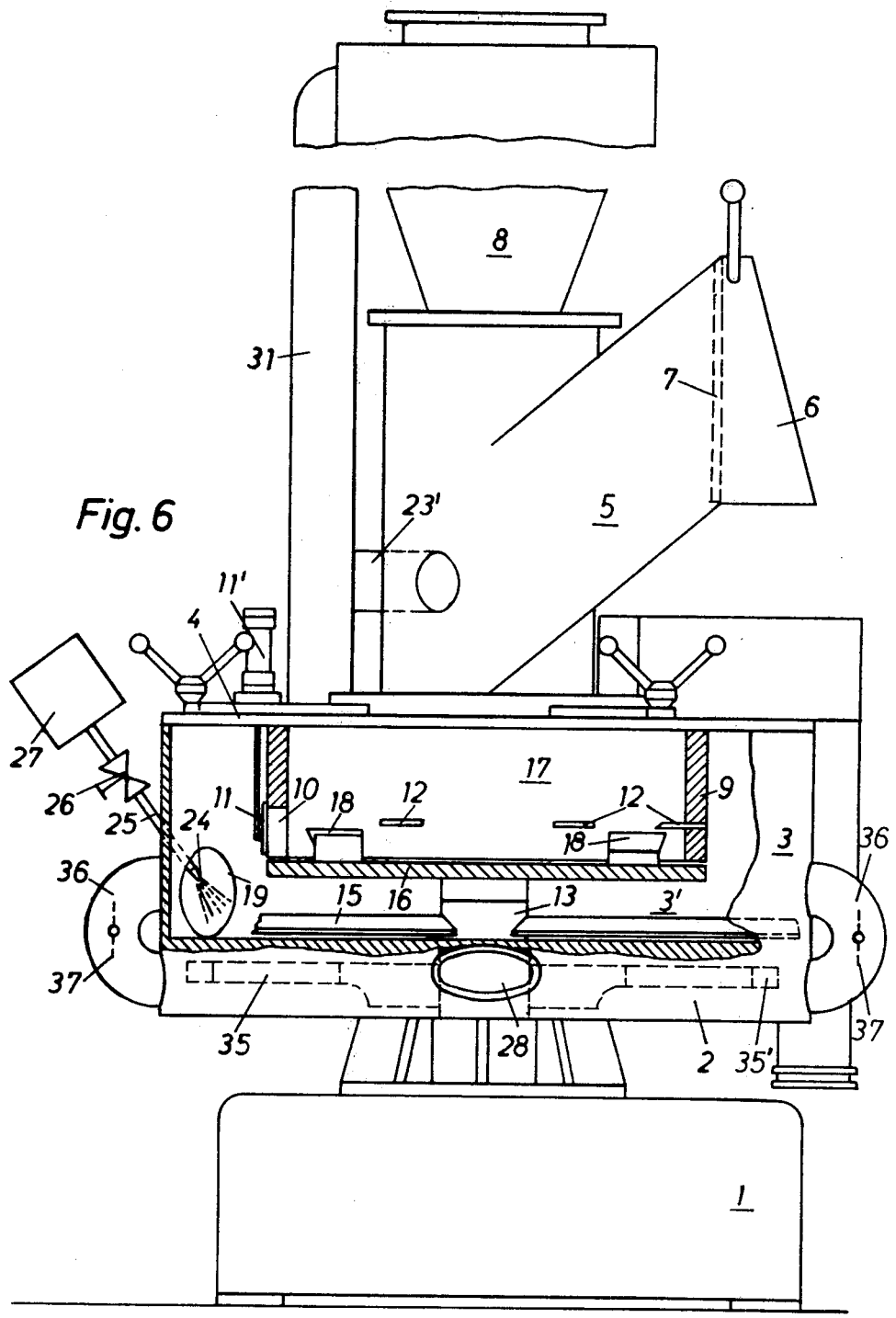
FIG. 6 is a varied embodiment of the mixing apparatus.

FIG. 6 shows a varied embodiment of the mixing apparatus. In the bottom part of the mixing container 2 is disposed in a chamber 35' a blower rotor 35 mounted on the agitator shaft 13. The suction stub of the blower is not shown. This stub may be connected with the pipe 23'. The pressure chamber of the blower is connected via pipes 36 with cooling-air injection openings 19. Shutoff means 37 are incorporated in the pipes 36.

This embodiment of the invention permits the cooling-air blower to be accomodated in an especially space-saving manner.

Figure 7:
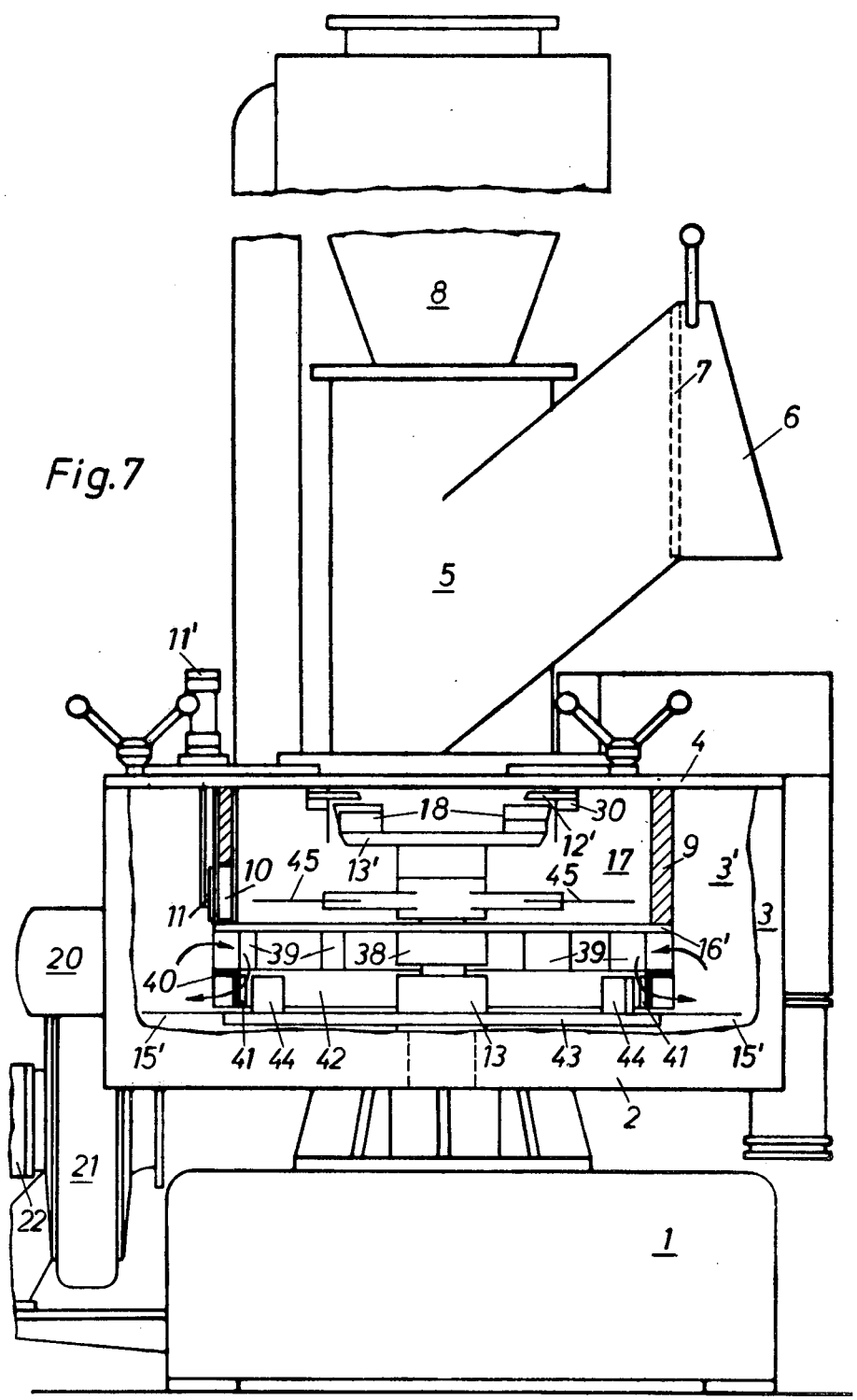
FIG. 7 is another embodiment of the invention.

The embodiment according to FIG. 7 has a bearing ring 38 for the agitator shaft 13 secured to the end plate 16'. At the circumference of the end plate 16' is supported, via webs 39, a stator ring 40 which, on the one hand, carries counter-cutting blades 41 and, on the other hand, a circumferential screen plate 42.

The agitator shaft 13 carries a rotor disk 43, whose edge is located opposite the front edge of the circumferential screen plate 42 and thus precludes a material flow downwardly within the area of the rotor disk 43.

At the circumference of the rotor disk 43 stirring wings 15' are provided. If necessary, stirring wings 15' may also be provided beneath the rotor disk 43. In addition, the rotor disk carries cutting blades 44 interacting with the counter-cutting blades 41. Inside the crushing chamber 17, mixing wings 45 are disposed on the agitator shaft 13.

The operation of this mixing apparatus is as follows: With the slide valve 11 being closed, material is fed in continuously through the feed hopper 5. This material is composed of thermoplastic mixtures with additions of material to be reconditioned. Consequently, the material has different shapes and different particle sizes. The material is cut by the crushing knives 18 in conjunction with the counter-knives 12' and drops into the crushing chamber 17. The mixing wings 45 provide for thorough mixing and, at the same time, for heating the material up to the condensing temperature so that it is gelatinized and granulated. When with continuing material feed the condensing temperature has been reached, the slide valve 11 is opened so that the material is transferred into the circulating chamber 3', where it is cooled by the cooled container walls and/or by cooling air supply. The material is circulated further by the stirring wings 15' and by the circulating motion gets through the openings between the webs 39 into the inner space within the circumferential screen plate 42 and the rotor disk 43. Those components of the material, the particle size of which is smaller than the mesh size of the circumferential screen plate 42, can easily pass into the outer space where they are cooled and circulated further. Bigger components are cut by the cutting blades until they have the particle size required and can also pass through the circumferential screen plate 42. The material is cooled permanently and can be discharged continuously during this cooling process. The slide valve 11 thus allows the material to be buffered during feed or condensation. A large charge is cooled within the circulating chamber 3' and continuously discharged during cooling.

I claim:

1. In mixing apparatus for condensing, mixing and granulating thermoplastic materials, especially scrap of foils, fibres, ribbons and hollow pieces, having a mixing container, a feed hopper mounted on the mixing container, a discharge slide valve, a vertical agitator shaft in said container which near the bottom carries stirring wings extending radially close to the container wall and at its upper end carries crushing knives, a crushing chamber defined by the upper portion of said container and surrounded by a ring wall and having its bottom defined by an end plate, said ring wall having fixed counter-knives thereon, the improvement comprising the arrangement wherein the agitator shaft (13) extends through said end plate (16) of the crushing chamber (17), and wherein said ring wall (9) is provided with at least one shuttable port (10) leading from said crushing chamber portion (3') of the mixing container (2) into the mixing portion of said container.

2. Mixing apparatus according to claim 1, characterized in that the end plate (16) is rigidly secured to the agitator shaft (13), and that the edge of the end plate (16) is located opposite the ring wall with no substantial gap therebetween (9).

3. Mixing apparatus according to claim 1, characterized in that the end plate (16') is attached to the ring wall (9) of the crushing chamber (17), the agitator shaft (13) extending through an opening in the end plate (16') and carried in a bearing ring (38), and (17) discharging wings (32) are provided on the shaft inside the crushing chamber.

4. Mixing apparatus according to any of claims 1 to 3, characterized in that in the shell (3) of the mixing container (2) above the bottom is provided a shuttable cooling-air injection opening (19), that the suction end of a blower (21) for cooling-air injection is in connection with the spout of the feed hopper (5), and water injection means (24) disposed within the cooling-air injection opening (19).

5. Mixing apparatus according to claim 1 characterized in that a blower rotor (35) for cooling-air injection underneath the bottom of the mixing container (2) is mounted on the agitator shaft (13), and that the pressure chamber of the blower is connected via at least one connecting pipes (36) with the inner container space.

6. Mixing apparatus according to claim 2 characterized in that inside the circulating chamber (3') on a rotor disk (43) having a diameter smaller than the diameter of the stirring wings (15') of the agitator shaft (13) cutting blades (44) are opposed by a stator ring (40) secured to the end plate (16') and having counter-cutting blades (41) and a circumferential screen plate (42), and that inside the crushing chamber mixing wings (45) are disposed on the agitator shaft (13).

7. Mixing apparatus according to claim 2 characterized in that the feed hopper (5) is attached to a ring piece (30) placed concentrically to the agitator shaft (13) and having counter-knives thereon (12'), and a disk-shaped end piece (13') of the agitator shaft defines a narrow gap with said ring wall (30') and carries crushing knives (18).

* * * * *